UNITED STATES PATENT OFFICE.

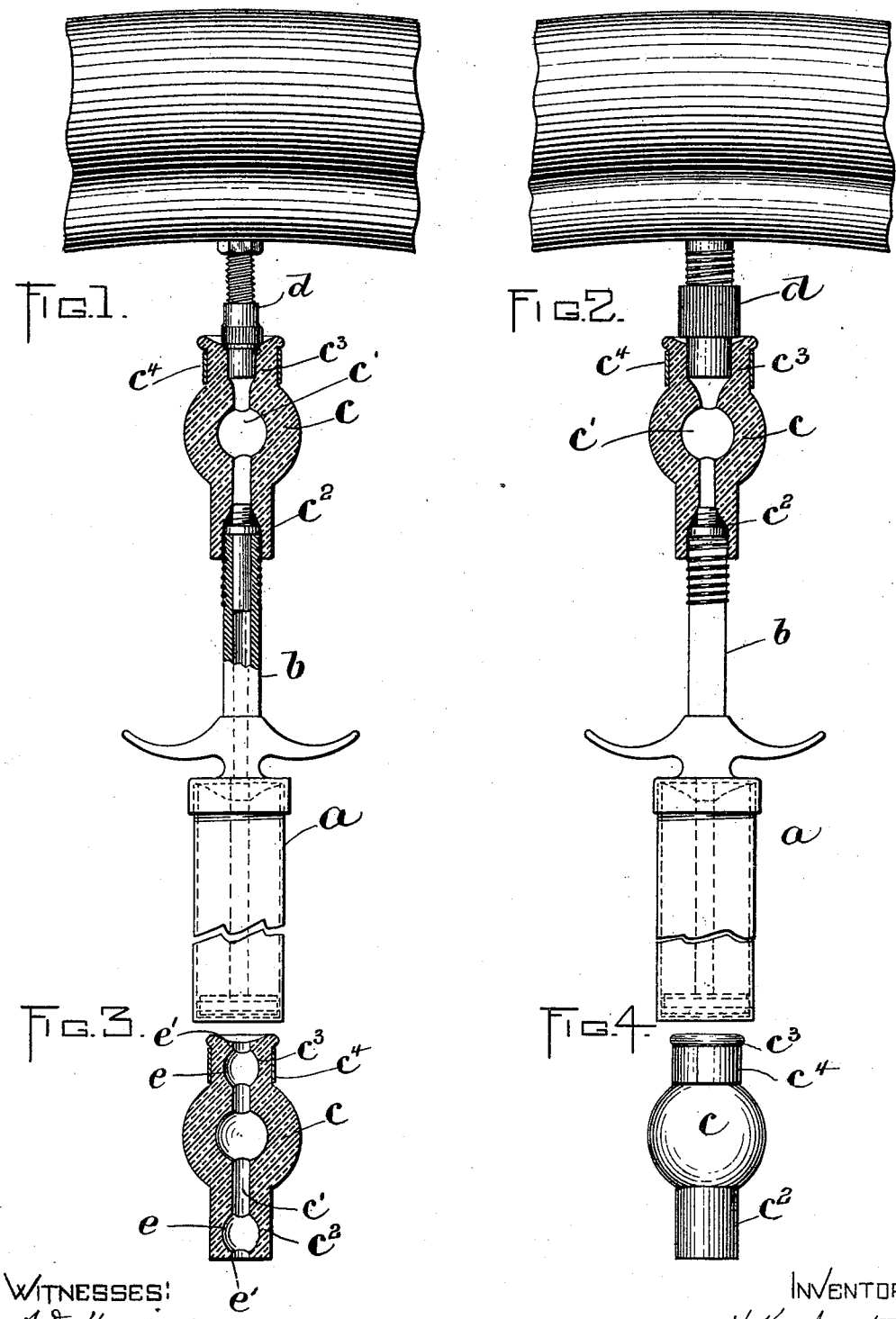

HENRY K. AUSTIN, OF READING, MASSACHUSETTS.

FLEXIBLE COUPLING FOR CONDUITS.

SPECIFICATION forming part of Letters Patent No. 583,667, dated June 1, 1897.

Application filed January 28, 1897. Serial No. 621,078. (No model.)

*To all whom it may concern:*

Be it known that I, HENRY K. AUSTIN, of Reading, in the county of Middlesex and State of Massachusetts, have invented certain new and useful Improvements in Flexible Couplings for Conduits, of which the following is a specification.

This invention relates to conduits or couplings for connecting a supply pipe or fitting, such as an air-delivering pipe connected with an air-pump, with a receiving pipe or fitting, such as the valve-casing of a bicycle-tire, the coupling forming a section of the conduit of which the said supply and receiving fittings form other sections.

The object of the invention is to provide an improved coupling of the character specified which shall be adapted to fit different-sized supply and receiving fittings to be quickly and easily connected thereto and to form a tight joint therewith.

The invention consists in the improved device which I shall now proceed to describe and claim.

Of the accompanying drawings, forming a part of this specification, Figure 1 is a side view of a portion of a bicycle-tire, showing an air-pump connected with the tire-valve by means of my improved coupling, the latter being shown in section. Fig. 2 is a similar view in which the valve is of a larger size. Fig. 3 is a vertical sectional view of the coupling. Fig. 4 is a side elevation thereof.

The same letters of reference indicate the same parts in all the figures.

In the drawings, $a$ represents a bicycle-pump or tire-inflater fitted with a supply tube or fitting $b$.

$c$ represents my improved coupling device, which is composed of flexible elastic material, such as india-rubber, and which has an aperture $c'$ extending throughout its length. Said coupling is provided with a distensible neck portion $c^2$, adapting it to be attached to the end of the supply tube or fitting $b$.

It will be seen that the coupling may be connected with any relatively small supply tube or fitting by merely being slipped over the end of said fitting, when the elastic neck $c^2$ will automatically contract within certain limits and inclose the supply-fitting and form an air-tight joint therewith.

The coupling $c$ is likewise provided with a distensible mouth $c^3$, adapted to engage in a similar manner with a receiving pipe or fitting, such as a valve-casing $d$. It may be found desirable in order to insure a tight joint to further provide a reinforcing-spring $c^4$, surrounding the neck $c^3$ and adapted to yield when said neck is distended, said spring being preferably a metallic split ring.

It will be seen from the foregoing description that I have provided a coupling which will fit any of the valves and air-pumps in common use, as well as one which may be very quickly attached and removed.

The coupling $c$ has provisions for insuring an air-tight connection between its ends and the parts which it connects and at the same time permitting the comparatively easy insertion of said parts into the ends of the coupling. To this end the duct or bore of the coupling is enlarged near its ends at $e\ e$, the diameter of the enlargement being approximately equal to that of the parts $b$ and $d$, the ends of the duct being of considerably less diameter and forming mouths or bearings $e'\ e'$, which hug the parts $b\ d$ more tightly than the enlarged parts $e\ e$ and form air-tight joints. The enlargements $e\ e$ increase the flexibility of the end portions of the coupling and permit the parts $b\ d$ to be inserted with less resistance than would be experienced if the said enlargements were not provided. At the same time the contracted portions $e'$ grasp the inserted parts with sufficient firmness for all practical purposes.

The coupling is provided with a peripheral ridge or shoulder between its end portions, said shoulder forming a bearing for the operator's thumb and finger when the coupling is being engaged with either of the parts $b$ and $d$ and preventing the thumb and finger from slipping when pushing the coupling onto the air-valve and onto the pump-fitting. To facilitate the engagement of the coupling with the air-valve $d$, I provide the coupling with an end recess or guide $c^5$, which enables the mouth or bearing $e'$ to readily find the air-valve.

I claim—

1. An elastic coupling of the character specified, having distensible automatically-contracting end portions, which are internally enlarged at points near their ends.

2. An elastic coupling of the character specified, having distensible automatically-contracting end portions and an intermediate external finger-rest or shoulder.

3. An elastic coupling of the character specified, having distensible automatically-contracting end portions, and an end recess or guide.

In testimony whereof I have signed my name to this specification, in the presence of two subscribing witnesses, this 18th day of November, A. D. 1897.

HENRY K. AUSTIN.

Witnesses:
A. D. HARRISON,
P. W. PEZZETTI.